US008595189B2

(12) United States Patent
Patwardhan

(10) Patent No.: US 8,595,189 B2
(45) Date of Patent: Nov. 26, 2013

(54) METHOD AND SYSTEM FOR IMPLEMENTING FAST INCREMENTAL BACKUPS

(75) Inventor: Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/420,358

(22) Filed: Mar. 14, 2012

(65) Prior Publication Data

US 2013/0246362 A1 Sep. 19, 2013

(51) Int. Cl.
*G06F 17/30* (2006.01)

(52) U.S. Cl.
USPC .......................................... 707/646; 707/812

(58) Field of Classification Search
USPC .................................... 707/644, 646, 803, 812
See application file for complete search history.

(56) References Cited

U.S. PATENT DOCUMENTS

| 5,727,206 | A  | * | 3/1998 | Fish et al. ...................... 714/4.2 |
| 6,782,389 | B1 | * | 8/2004 | Chrin et al. ........................... 1/1 |
| 7,234,077 | B2 | * | 6/2007 | Curran et al. .................... 714/15 |
| 7,624,106 | B1 | * | 11/2009 | Manley et al. ................. 707/786 |
| 7,730,213 | B2 | * | 6/2010 | Howard ......................... 709/248 |
| 8,180,811 | B2 | * | 5/2012 | Shyam et al. .................. 707/819 |
| 8,214,406 | B2 | * | 7/2012 | Kushwah ....................... 707/797 |
| 8,224,864 | B1 | * | 7/2012 | Jernigan et al. ................ 707/802 |
| 2006/0010177 | A1 | * | 1/2006 | Kodama ........................ 707/204 |
| 2006/0075294 | A1 | * | 4/2006 | Ma et al. .......................... 714/13 |
| 2011/0282917 | A1 | * | 11/2011 | Desai et al. .................... 707/803 |

* cited by examiner

*Primary Examiner* — Debbie Le
(74) *Attorney, Agent, or Firm* — Wilmer Cutler Pickering Hale and Dorr LLP

(57) ABSTRACT

A method for fast incremental replication of a file system. The method includes, at a data storage level, tracking file system status for a plurality of files by using a data structure inside respective inodes for the plurality of files, and at a file system level, tracking file system status for a plurality of files by using a file system mask structure. For all files present in a backup, a catalogue of the file path name and inode number is maintained on a source file system. During incremental backup, a source file system data structure enumerating a plurality of modified inodes is consulted. For inodes that have not been marked as removed or created, the file system mask structure that tracks modified portions is consulted to obtain a file incremental change and inodes. The method further includes performing incremental backup using the inodes that have been modified and appended.

20 Claims, 8 Drawing Sheets

METHOD AND SYSTEM FOR IMPLEMENTING FAST INCREMENTAL BACKUPS

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Periodic replication is one technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. In addition to disaster recovery, the replicated data enables a number of other uses, such as, for example, data mining, reporting, testing, and the like. In this manner, the replicated data copy ensures data integrity and availability. Additionally, periodic replication technology is frequently coupled with other high-availability techniques, such as clustering, to provide an extremely robust data storage solution.

Performing a replication operation, backup operation, or the like on a large data set may take a significant amount of time to complete. The sheer size of the data set makes a replication operation take a significant amount of time. During this time, if the data set is maintained live, a problem with intervening accesses to the data set will have to be addressed. For example, on a large enterprise class system, there may be thousands of writes to that data set while it is being backed up or replicated. This factor can create data corruption hazards.

Currently, file system backup or replication (e.g., either incremental or whole file) requires knowledge of which all files changed in a file system. Further, it is required to know which regions of those files got changed for incremental backup. Replication or backup products either troll through the file system namespace looking for modified files which can be costly if a file system has tens of millions of files (e.g., a common case these days) and only a few thousand files get modified every day. The same holds true for new file creates and removed files. Using File Change Log (or analogous features) degrades file system performance significantly and requires agents to preserve the log before log wrap around.

SUMMARY OF THE INVENTION

In one embodiment, the present invention is implemented as a method for fast incremental replication of a file system. The method includes the steps of at a data storage level, tracking file system status for a plurality of files by using a data structure inside respective inodes for the plurality of files, and at a file system level, tracking file system status for a plurality of files by using a file system mask structure. The method further includes for all files present in a backup, maintaining a catalogue of the file path name and inode number on a source file system, and during incremental backup, consulting a source file system data structure enumerating a plurality of modified inodes to determine inodes that have been marked as removed or created. The method further includes for inodes that have not been marked as removed or created, consulting the file system mask structure that tracks modified portions to obtain a file incremental change and inodes that have been modified and appended, and performing incremental backup using the inodes that have been modified and appended.

In one embodiment, if a file was removed, an on-disk inode tracks the same separately by using a bit field.

In one embodiment, if a file was created, an on-disk inode tracks the same separately by using a bit field.

In one embodiment, each file in the file system tracks ranges modified by maintaining such information persistently by dividing said each file into chunks and representing the chunks by a bit-map.

In one embodiment, each file in the file system tracks ranges modified by maintaining such information persistent on at the data storage level.

In one embodiment, each time a file is created or renamed, said file's name and parent directory inode number is recorded with the inode at the data storage level.

In one embodiment, once a directory inode that is not marked as created has been reached, a path can be extracted from an inode number using a catalog maintained at a backup.

In one embodiment, the present invention is implemented as a computer readable storage medium having stored thereon, computer executable instructions that, if executed by a computer system cause the computer system to perform a method for fast incremental backup. The method includes the steps of at a data storage level, tracking file system status for a plurality of files by using a data structure inside respective inodes for the plurality of files, and at a file system level, tracking file system status for a plurality of files by using a file system mask structure. The method further includes for all files present in a backup, maintaining a catalogue of the file path name and inode number on a source file system, and during incremental backup, consulting a source file system data structure enumerating a plurality of modified inodes to determine inodes that have been marked as removed or created. The method further includes for inodes that have not been marked as removed or created, consulting the file system mask structure that tracks modified portions to obtain a file incremental change and inodes that have been modified and appended, and performing incremental backup using the inodes that have been modified and appended.

In one embodiment the present invention is implemented as a computer system having a microprocessor coupled to a computer readable memory, the memory having computer readable code therein which when executed by the computer system causes the computer system to implement a method for fast incremental backup. The method includes the steps of at a data storage level, tracking file system status for a plurality of files by using a data structure inside respective inodes for the plurality of files, and at a file system level, tracking file system status for a plurality of files by using a file system mask structure. The method further includes for all files present in a backup, maintaining a catalogue of the file path name and inode number on a source file system, and during incremental backup, consulting a source file system data structure enumerating a plurality of modified inodes to determine inodes that have been marked as removed or created.

The method further includes for inodes that have not been marked as removed or created, consulting the file system mask structure that tracks modified portions to obtain a file incremental change and inodes that have been modified and appended, and performing incremental backup using the inodes that have been modified and appended.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
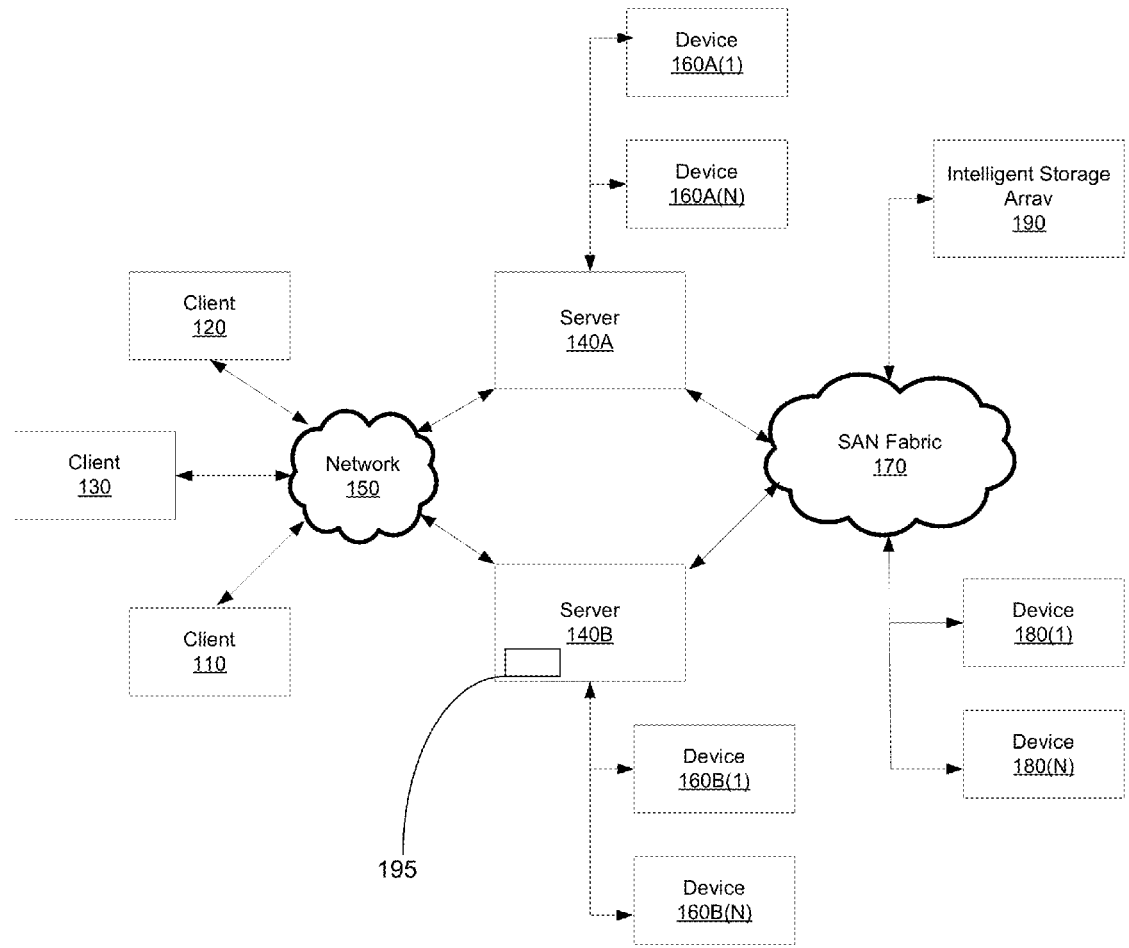
FIG. 1 shows a diagram depicting a network architecture of a client server based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a file system replication agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
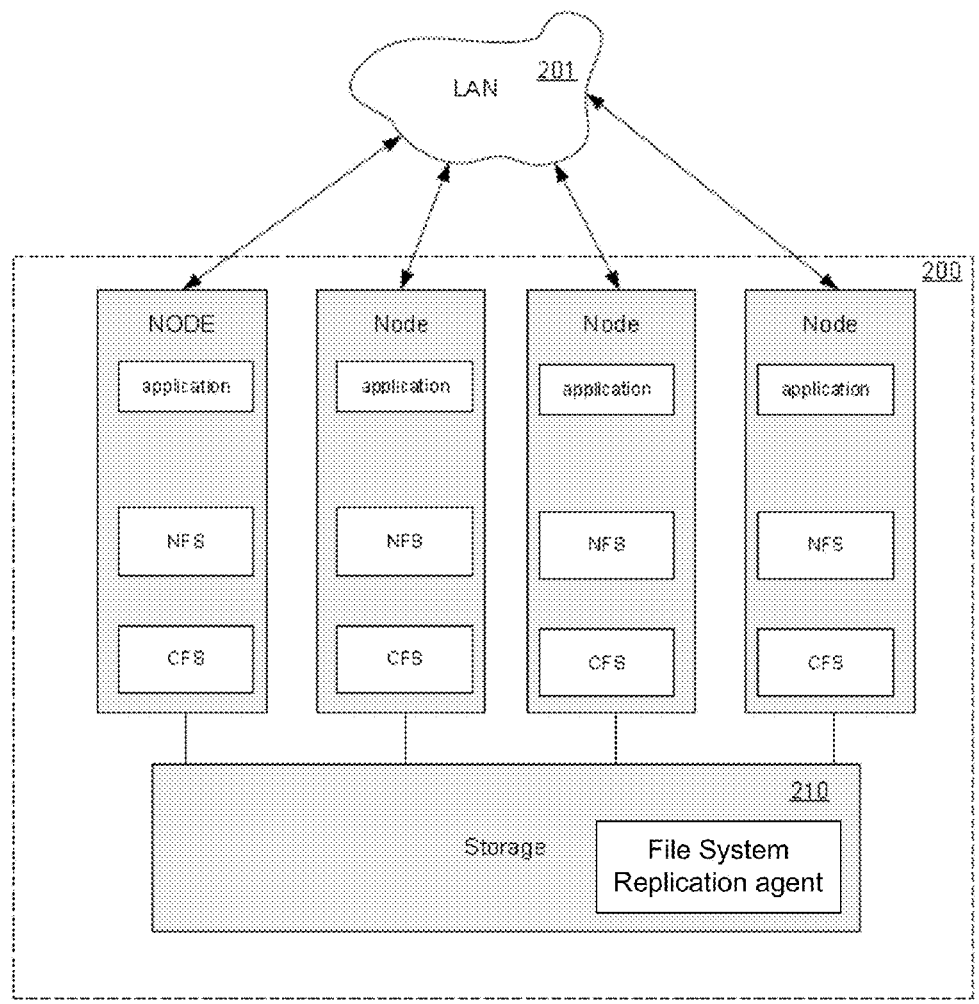
FIG. 2 shows a diagram depicting an exemplary high availability cluster-based computing system in accordance with one embodiment of the present invention.

FIG. 2 shows a diagram depicting an exemplary high availability cluster-based computing system 200 in accordance with one embodiment of the present invention. As illustrated in FIG. 2, 4 nodes are shown coupled to a common storage device 210. In one embodiment, the nodes on each host are an instantiation comprising an application, a network file system (NFS) and a cluster file system (CFS). Hence, the computer system 200 comprises a four node cluster. Each of the constituent nodes is shown connected to the storage device 210. The nodes of the cluster communicate with one another via the local area network 201. These local area networks can in turn be connected to one or more wide area networks (e.g., the Internet). Although the embodiment is described in the context of a cluster, it should be appreciated that embodiments of the present invention can readily scale and function in distributed computer systems and/or cloud based computer systems having hundreds or thousands of nodes. I FIG. 2 shows the manner in which the common storage device can support the mounting and dismounting of the various file systems to which it provides data storage services. The storage device 210 is typically equipped to provide high availability and redundancy while maintaining flexibility of the storage services provided to the various file systems. In the FIG. 2 embodiment, by way of example, the storage device 210 includes a file system replication agent that functions by allocating data blocks to thinly provisioned mounted file systems and providing storage space reclamation from provisioned space provided to the mounted file systems.

Figure 3:
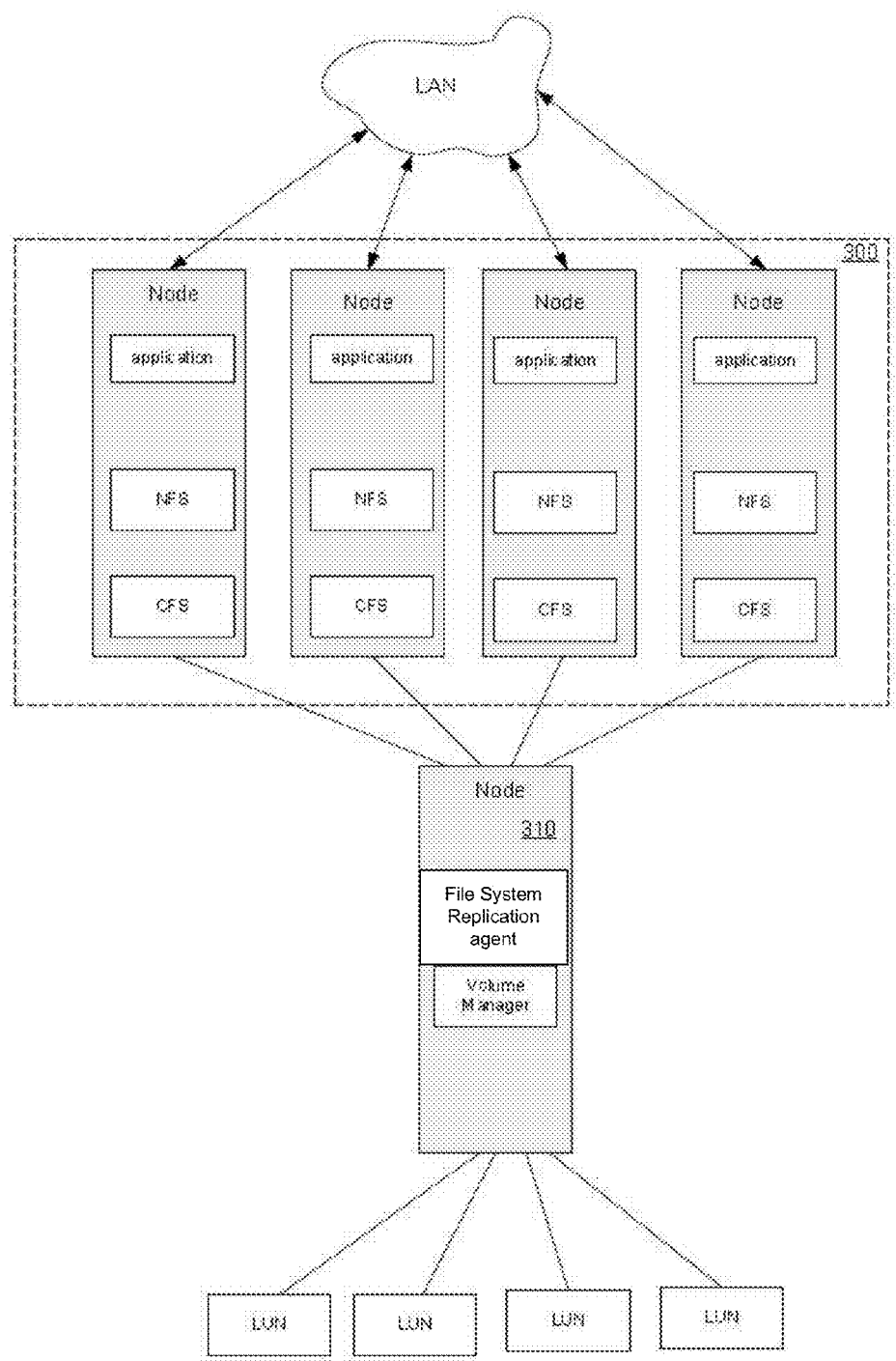
FIG. 3 shows a first exemplary implementation of a storage device in accordance with one embodiment of the present invention.

FIG. 3 shows a first exemplary implementation of a storage device in accordance with one embodiment of the present invention. As depicted in FIG. 3, the 4 nodes of the cluster 300 are coupled to node 310 which hosts a volume manager and the file system replication agent. The volume manager functions with a plurality of coupled LUNs (e.g., disk drives, solid-state drives, or the like) to provide volumes (e.g., data storage) which can be used to mount the plurality of network file systems and cluster file systems.

Figure 4:
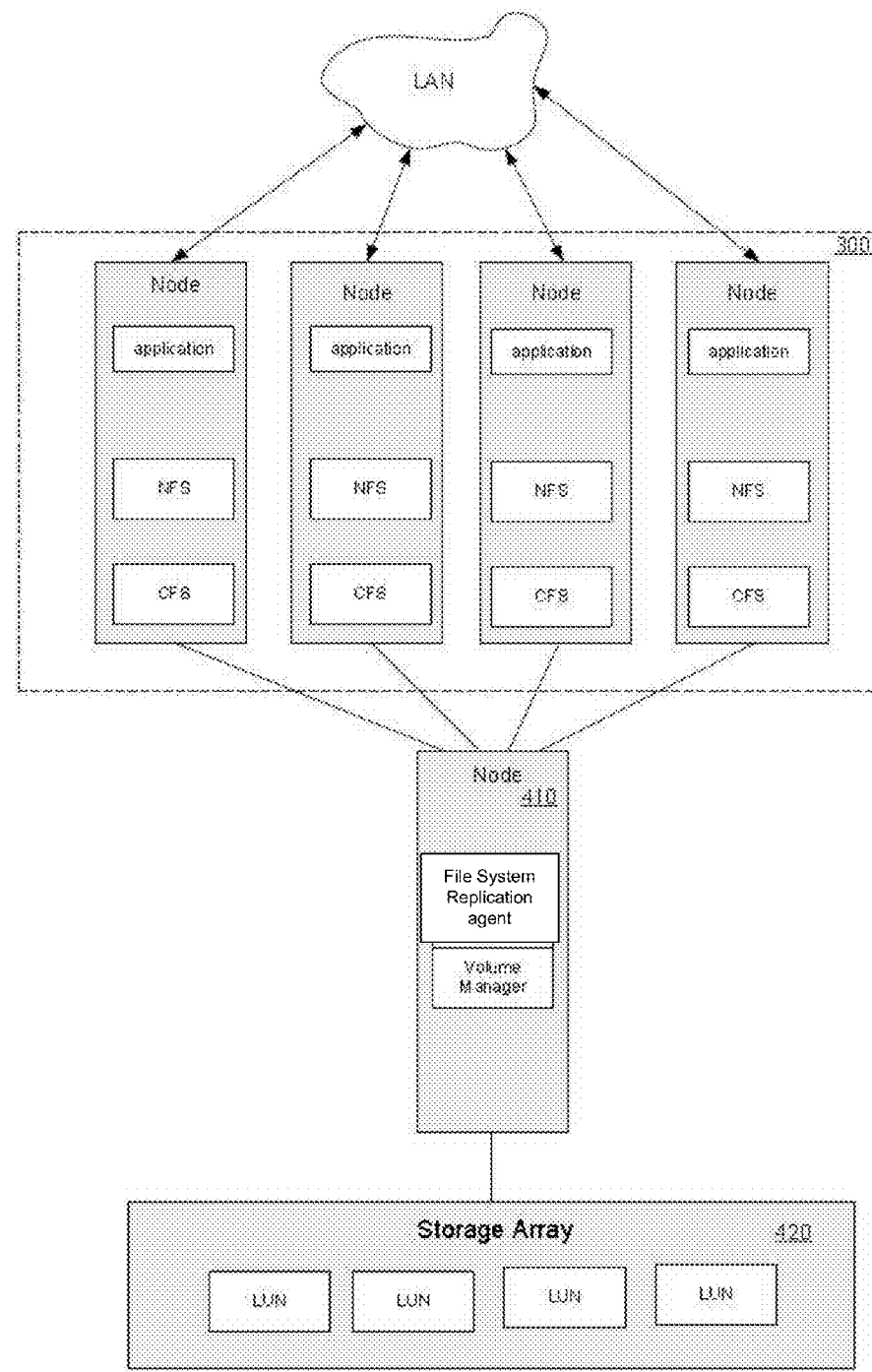
FIG. 4 shows a second exemplary implementation of a storage device in accordance with one embodiment of the present invention.

FIG. 4 shows a second exemplary implementation of a storage device in accordance with one embodiment of the present invention. As depicted in FIG. 4, the 4 nodes of the cluster 300 are coupled to a node 410 which hosts a volume manager and the file system replication agent. However, in the FIG. 4 embodiment, the volume manager functions with a plurality of LUNs that are created by a storage array 420. The storage array 420 is used to provide LUNs which can be used to mount the plurality of network file systems and cluster file systems.

Embodiments of the present invention implements methods and systems for identifying which of a number of files of a file system were modified, created or removed without having to traverse through the file system namespace. Further, embodiments of the present invention specify how name space lookups (or reverse name lookups) can be avoided altogether for newly created, modified and removed files.

Figure 5:
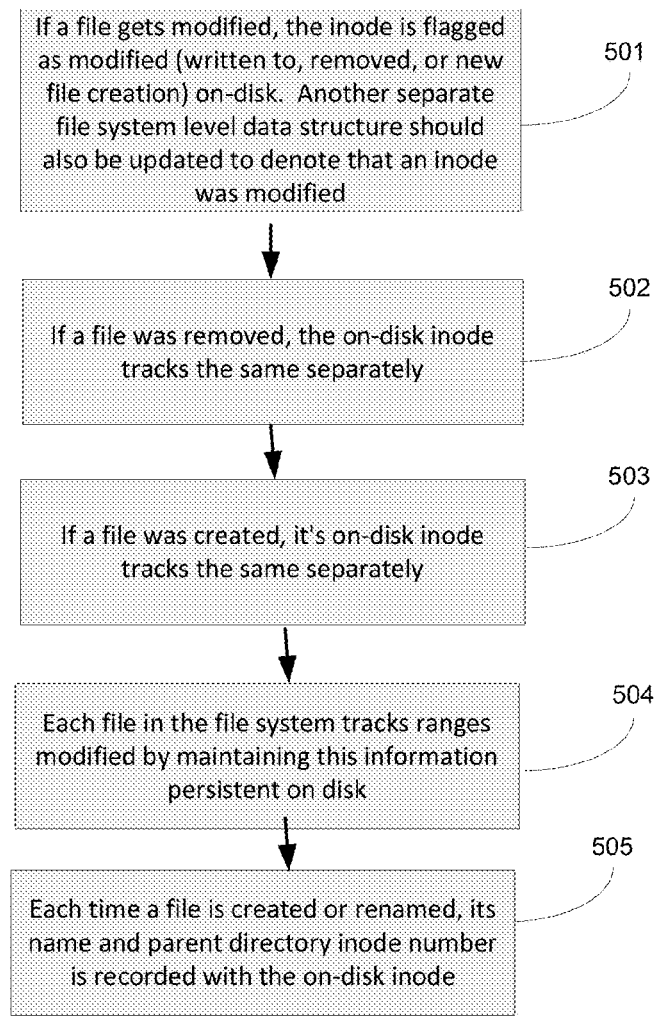
FIG. 5 shows a flowchart of an incremental replication process 500 in accordance with one embodiment of the present invention.

FIG. 5 shows a flowchart of an incremental replication process 500 in accordance with one embodiment of the present invention. Embodiments of the present invention require that a physical file system provide/maintain the following components as diagram in FIG. 5.

In step 501, if a file gets modified, the inode for that file is flagged as modified (written to, removed, or new file creation) on-disk, or other storage device. In one embodiment this tracking of file system status can be implemented by using a bit field in the inode. As used herein, an inode generally refers to a data structure that stores all the information about a regular file, directory, or other file system object. This happens only once when the file is modified for the first time. Another separate file system level data structure should also be updated to denote that an inode was modified. In one embodiment is implemented by using a bitmap for the inodes. Again this is a one time activity.

In step 502, if a file was removed, the on-disk inode tracks the same separately. In one embodiment this can be implemented by using another bit field. This field needs be set only once even if the inode transitions through a remove, create, remove cycle several times over.

In step 503, if a file was created, it's on-disk inode tracks the same separately. In one embodiment this can be implemented by using another bit field. This field needs be set only once even if the inode transitions through create, remove, create cycle several times over.

In step 504, each file in the file system tracks ranges modified by maintaining this information persistent on disk. In one embodiment, it can be done by dividing the file into chunks and representing the chunks by a bit-map, subject to the following conditions. A chunk is marked as modified only once. The size of the file is persistently maintained on-disk before entertaining appending writes (referred to as "lastsize"). Appending write ranges (chunks) are not tracked as modified. Additionally, if a file inode is marked as newly created, no bit map is maintained for such files as all of its contents are new.

In step 505, each time a file is created or renamed, its name and parent directory inode number is recorded with the on-disk inode.

Figure 6:
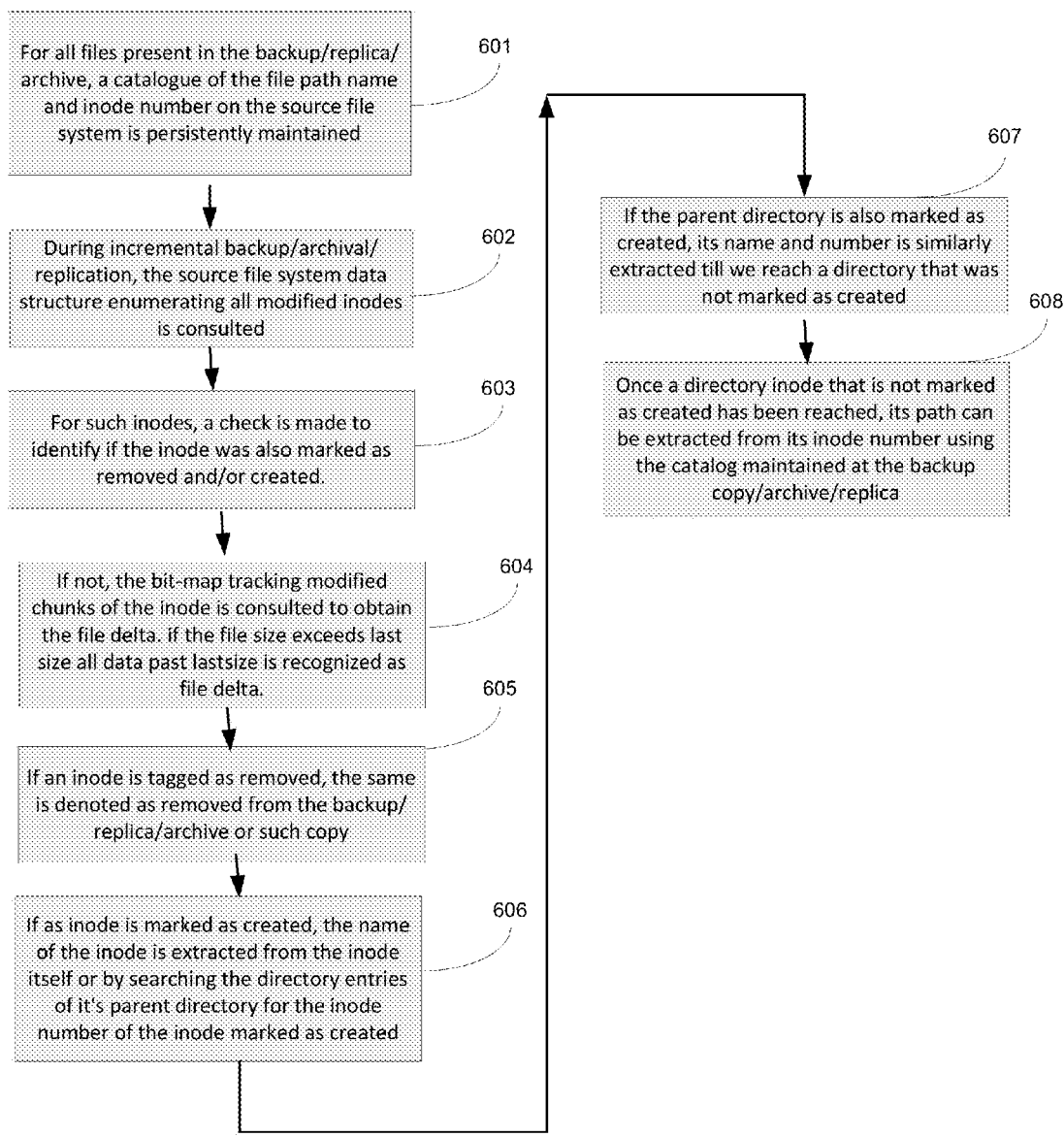
FIG. 6 shows a flowchart of an incremental replication process 600 in accordance with one embodiment of the present invention.

FIG. 6 shows a flowchart of an incremental replication process 600 in accordance with one embodiment of the present invention. Any application that needs to know files to replicate/backup implements the algorithm of process 600.

In step 601, for all files present in the backup/replica/archive, a catalogue of the file path name and inode number on the source file system is persistently maintained.

In step 602, during incremental backup/archival/replication, the source file system data structure enumerating all modified inodes is consulted.

In step 603, for such inodes, a check is made to identify if the inode was also marked as removed and/or created.

In step 604, if not, the bit-map tracking modified chunks of the inode (e.g., the file system mask structure) is consulted to obtain the file delta (e.g., incremental change). If the file size exceeds last size (e.g., as described in step 504 above) all data past "lastsize" is recognized as file delta.

In step 605, if an inode is tagged as removed, the same is denoted as removed from the backup/replica/archive or such copy.

In step 606, if as inode is marked as created, the name of the inode is extracted from the inode itself (if recorded) or by searching the directory entries of it's parent directory for the inode number of the inode marked as created.

In step 607, if the parent directory is also marked as created, its name and number is similarly extracted till we reach a directory that was not marked as created.

In step 608 once a directory inode that is not marked as created has been reached, its path can be extracted from its inode number using the catalog maintained at the backup copy/archive/replica. It should be noted that for inodes marked as created and which share the same parent inode number, the just mentioned process needs be executed only once.

In this manner, after all modified inodes have been examined, embodiments of the present invention can determine the inodes that were modified and appended; all inodes that were removed; and all directories and files that were created. Once an incremental backup/replica/archival is completed, all the file system data structures and inode level data structures tracking modified inodes and their ranges are reset and the data structures reused for the next backup. It should be noted that, in one embodiment, appending writes and file truncate (e.g., down) are not tracked but instead the file size before the appending write or after the truncate down is recorded and file range tracking is done for normal over-writes.

Figure 7:
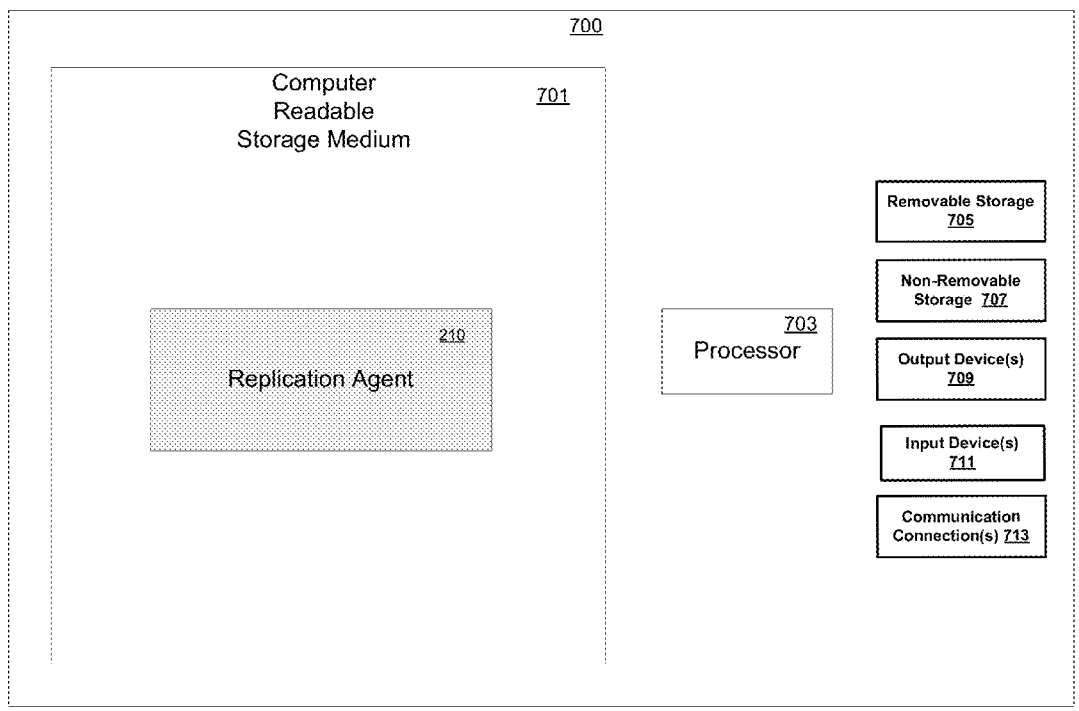
FIG. 7 depicts a block diagram of a computer system suitable for implementing certain functionality in accordance with one embodiment of the present invention.

FIG. 7 shows an exemplary computer system 700 according to one embodiment. Computer system 700 depicts the components of a basic computer system providing the execution environment for certain hardware-based and software-based functionality for the above described embodiments. For example, computer system 700 can be a system upon which the one or more software agents (e.g., file system replication agent 210 from FIG. 2) are instantiated. Computer system 700 can be implemented as, for example, a server computer system, workstation computer system, desktop computer system, or laptop computer system. Similarly, computer system 700 can be implemented as a handheld device. Computer system 700 typically includes at least some form of computer readable media (e.g., computer readable storage medium 701). Computer readable media can be a number of different types of available media that can be accessed by computer system 700 and can include, but is not limited to, computer storage media.

In its most basic configuration, computer system 700 typically includes processing unit 703 and memory 701. Depending on the exact configuration and type of computer system 700 that is used, memory 701 can be volatile (e.g., such as DRAM, etc.) 701a, non-volatile 701b (e.g., such as ROM, flash memory, etc.) or some combination of the two. Similarly, the memory 701 can comprise other devices besides solid-state devices, such as, for example, magnetic disk-based media, optical media, or the like.

Additionally, computer system 700 can include other mass storage systems (e.g., removable 705 and/or non-removable 707) such as magnetic or optical disks or tape. Similarly, computer system 700 can include input devices 709 and/or output devices 711 (e.g., such as a display). Computer system 700 can further include network connections 713 to other devices, computers, networks, servers, etc. using either wired or wireless media. As all of these devices are well known in the art, they need not be discussed in detail.

It should further be noted, that the computer system 700 can have some, most, or all of its functionality supplanted by a distributed computer system having a large number of dispersed computing nodes, such as would be the case where the functionality of the computer system 700 is partly or wholly executed using a cloud computing environment.

Figure 8:
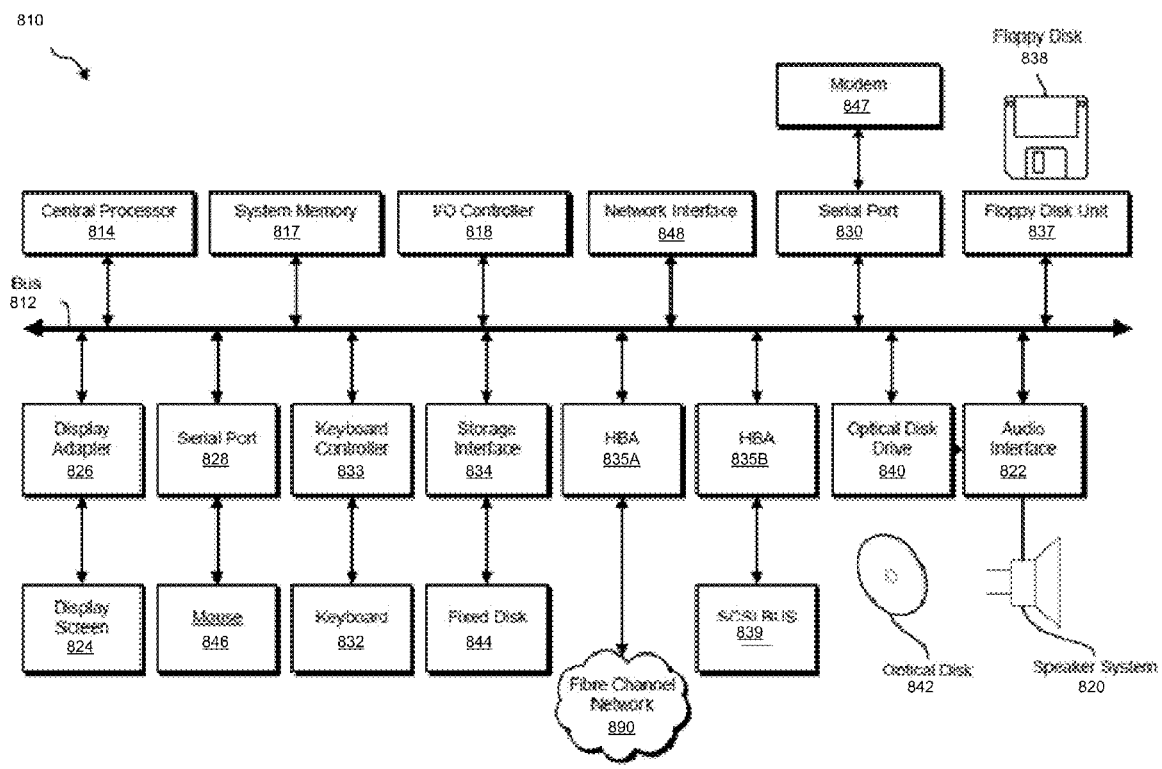
FIG. 8 shows an exemplary computer system according to one embodiment.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a replication agent 210 which implements the replication functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for fast incremental replication of a file system, comprising:
   at a data storage level, tracking a file system status for a plurality of files by using a data structure inside respective inodes for the plurality of files;
   at a file system level, tracking a file system status for a plurality of files by using a file system mask structure;
   for all files present in a backup, maintaining a catalogue of a file path name and inode number on a source file system;
   during incremental backup, consulting a source file system data structure enumerating a plurality of modified inodes to determine inodes that have been marked as removed or created;
   for inodes that have not been marked as removed or created, consulting the file system mask structure that tracks modified portions to obtain a file incremental change and inodes that have been modified and appended, the file incremental change indicating a difference between a stored file size and a subsequent file size; and
   performing incremental backup using the inodes that have been modified and appended.

2. The method of claim 1, wherein when a file has been removed, an on-disk inode tracks the same separately by using a bit field.

3. The method of claim 1, wherein when a file has been created, an on-disk inode tracks the same separately by using a bit field, and regarding said file creation, no file range modification is done.

4. The method of claim 1, wherein each file in the file system tracks ranges modified by maintaining such information persistently by dividing said each file into chunks and representing the chunks by a bit-map.

5. The method of claim 1, wherein each file in the file system tracks ranges modified by maintaining such information persistent on at the data storage level.

6. The method of claim 1, wherein each time a file is created or renamed, said file's name and parent directory inode number is recorded with the inode at the data storage level.

7. The method of claim 1, wherein once a directory inode that is not marked as created has been reached, a path is extracted from an inode number using a catalog maintained at a backup.

8. A computer readable storage medium having stored thereon computer executable instructions that, when executed by a computer system, cause the computer system to perform a method comprising:
   at a data storage level, tracking a file system status for a plurality of files by using a data structure inside respective inodes for the plurality of files;
   at a file system level, tracking a file system status for a plurality of files by using a file system mask structure;
   for all files present in a backup, maintaining a catalogue of the file path name and inode number on the source file system;
   during incremental backup, consulting a source file system data structure enumerating a plurality of modified inodes to determine inodes that have been marked as removed or created;
   for inodes that have not been marked as removed or created, consulting the file system mask structure that tracks modified portions to obtain a file incremental change and inodes that have been modified and appended, the file incremental change indicating a difference between a stored file size and a subsequent file size; and
   performing incremental backup using the inodes that have been modified and appended.

9. The computer readable storage medium of claim 8, wherein when a file has been removed, an on-disk inode tracks the same separately by using a bit field.

10. The computer readable storage medium of claim 8, wherein when a file has been created, an on-disk inode tracks the same separately by using a bit field.

11. The computer readable storage medium of claim 8, wherein each file in the file system tracks ranges modified by maintaining such information persistently by dividing said each file into chunks and representing the chunks by a bit-map.

12. The computer readable storage medium of claim 8, wherein each file in the file system tracks ranges modified by maintaining such information persistent on at the data storage level.

13. The computer readable storage medium of claim 8, wherein each time a file is created or renamed, said file's name and parent directory inode number is recorded with the inode at the data storage level.

14. The computer readable storage medium of claim 8, wherein once a directory inode that is not marked as created has been reached, a path is extracted from an inode number using a catalog maintained at a backup.

15. A computer system having a microprocessor coupled to a computer readable memory, the memory having computer readable code therein which when executed by the computer system causes the computer system to implement a method comprising:
   at a data storage level, tracking a file system status for a plurality of files by using a data structure inside respective inodes for the plurality of files;
   at a file system level, tracking a file system status for a plurality of files by using a file system mask structure;
   for all files present in a backup, maintaining a catalogue of the file path name and inode number on the source file system;

during incremental backup, consulting a source file system data structure enumerating a plurality of modified inodes to determine inodes that have been marked as removed or created;

for inodes that have not been marked as removed or created, consulting the file system mask structure that tracks modified portions to obtain a file incremental change and inodes that have been modified and appended, the file incremental change indicating a difference between a stored file size and a subsequent file size;

performing incremental backup using the inodes that have been modified and appended.

16. The computer system of claim 15, wherein when a file has been removed, an on-disk inode tracks the same separately by using a bit field.

17. The computer system of claim 15, wherein when a file has been created, an on-disk inode tracks the same separately by using a bit field, and regarding said file creation, no file range modification is done.

18. The computer system of claim 15, wherein each file in the file system tracks ranges modified by maintaining such information persistently by dividing said each file into chunks and representing the chunks by a bit-map.

19. The computer system of claim 15, wherein each file in the file system tracks ranges modified by maintaining such information persistent on at the data storage level.

20. The computer system of claim 15, wherein each time a file is created or renamed, said file's name and parent directory inode number is recorded with the inode at the data storage level.

* * * * *